US006708495B2

(12) United States Patent
Calvez et al.

(10) Patent No.: US 6,708,495 B2
(45) Date of Patent: Mar. 23, 2004

(54) FASTENING A CMC COMBUSTION CHAMBER IN A TURBOMACHINE USING BRAZED TABS

(75) Inventors: Gwénaëlle Calvez, Melun (FR); Eric Conete, Merignac (FR); Alexandre Forestier, Boissise la Bertrand (FR); Didier Hernandez, Quiers (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/162,385

(22) Filed: Jun. 5, 2002

(65) Prior Publication Data

US 2002/0184892 A1 Dec. 12, 2002

(30) Foreign Application Priority Data

Jun. 6, 2001 (FR) .......................................... 01 07363

(51) Int. Cl.[7] .................................................. F02C 7/20
(52) U.S. Cl. ........................................... 60/753; 60/800
(58) Field of Search ................................... 60/753, 800

(56) References Cited

U.S. PATENT DOCUMENTS 2,509,593 A 5/1950 Huyton
6,131,384 A 10/2000 Ebel
6,397,603 B1 * 6/2002 Edmondson et al. ......... 60/753

FOREIGN PATENT DOCUMENTS

| | | |
|---|---|---|
| FR | 0 316 233 | 11/1988 |
| GB | 1 570 875 | 3/1976 |
| GB | 2 035 474 | 11/1979 |

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

A turbomachine has inner and outer annular shells of metal material containing, in a gas flow direction F, a fuel injector assembly, an annular combustion chamber of composite material, and an annular nozzle of metal material forming the fixed-blade inlet stage of a high pressure turbine. Provision is made for the combustion chamber to be held in position between the inner and outer metal annular shells by a plurality of flexible metal tabs having first ends interconnected by a metal ring fixed securely to each of the annular shells by first fixing means, and second ends fixed by second fixing means on a ring of composite material fixed securely to said composite material combustion chamber, the flexibility of said metal fixing tongues allowing expansion to take place freely in a radial direction at high temperatures between said composite material combustion chamber and said metal annular shells.

12 Claims, 2 Drawing Sheets

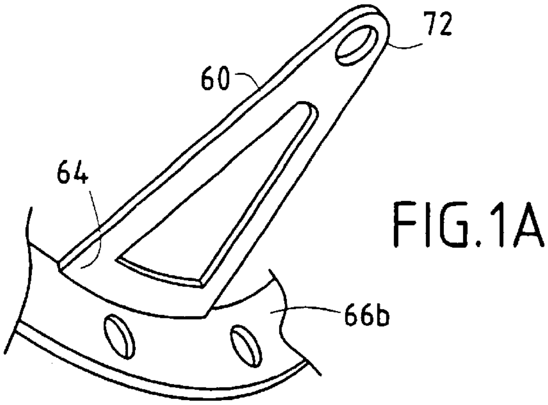
FIG.1A
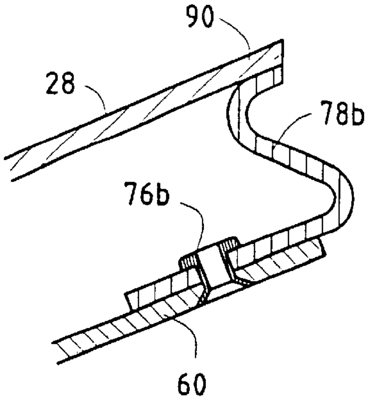
FIG.1B
FIG.2
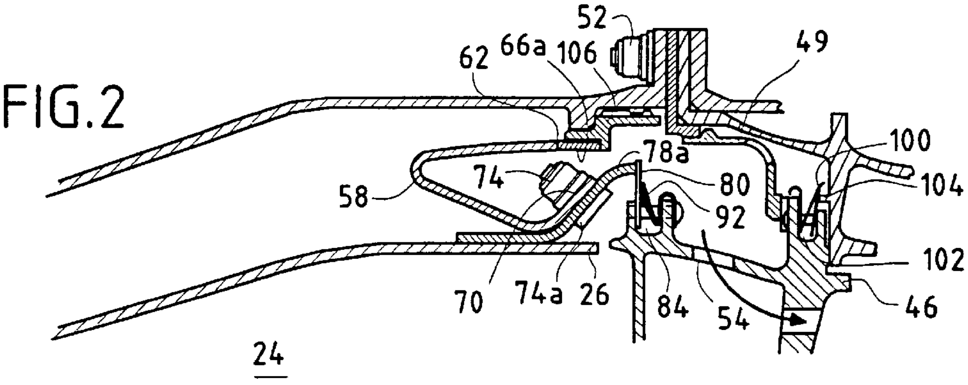
FIG.3
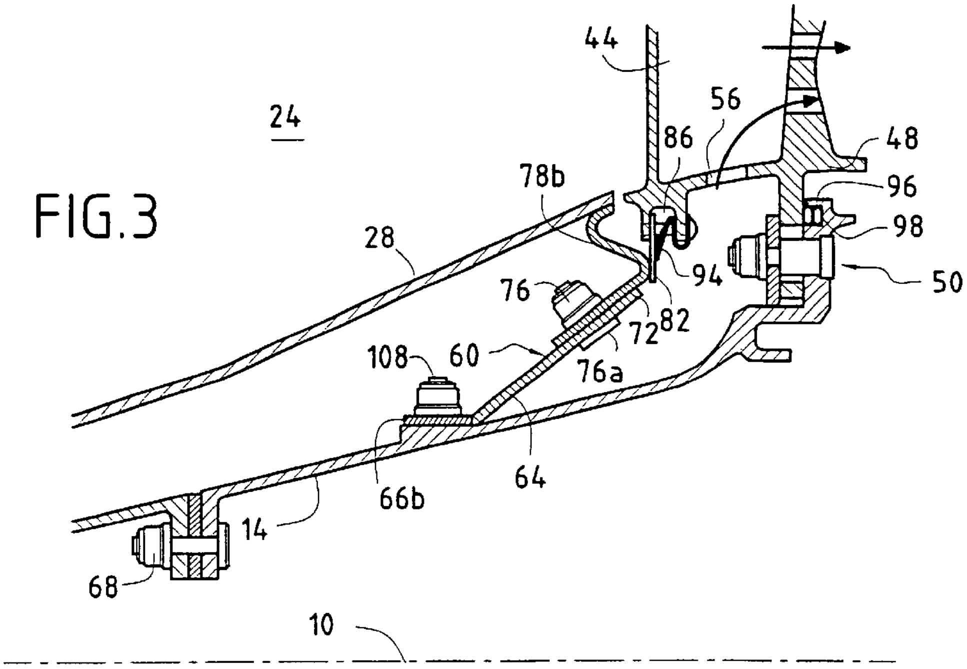

FASTENING A CMC COMBUSTION CHAMBER IN A TURBOMACHINE USING BRAZED TABS

FIELD OF THE INVENTION

The present invention relates to the specific field of turbomachines and it relates more particularly to the problem posed by assembling a combustion chamber made of a composite material of the ceramic matrix composite (CMC) type in the metal chamber casings of a turbomachine.

PRIOR ART

Conventionally, in a turbojet or a turboprop, the high pressure turbine, in particular its inlet nozzle (HPT nozzle), the combustion chamber, and the inner and outer shells (or casings) of said chamber are all made out of the same material, generally a metal. Nevertheless, under certain particular conditions of use implementing particularly high combustion temperatures, a metal chamber turns out to be completely unsuitable from a thermal point of view and it is necessary to make use of a chamber that is based on high temperature composite materials of the CMC type. However, difficulties of implementation and materials costs mean that such materials are generally restricted to being used for the composite chamber itself, with the high pressure turbine inlet nozzle and the inner and outer shells of the chamber then still being made more conventionally out of metal materials. Unfortunately, metals and composites have coefficients of thermal expansion that are very different. This gives rise to particularly awkward problems of connection with the inner and outer shells of the combustion chamber and of interface at the nozzle at the inlet to the high pressure turbine.

OBJECT AND BRIEF SUMMARY OF THE INVENTION

The present invention mitigates those drawbacks by proposing a mounting for the combustion chamber in the casings with the ability to absorb the displacements induced by the various coefficients of expansion of those parts. An object of the invention is thus to propose a mounting which makes the best use of the existing characteristics of the combustion chamber.

These objects are achieved by a turbomachine comprising inner and outer annular shells of metal material containing in a gas flow direction F: a fuel injector assembly, an annular combustion chamber of composite material and having a longitudinal axis, and an annular nozzle of metal material and forming the fixed-blade inlet stage of a high pressure turbine, wherein said composite material combustion chamber is held in position between said inner and outer metal annular shells by a plurality of flexible tongues, first ends of said tongues being interconnected by a metal ring fixed securely to each of said inner and outer metal annular shells by first fixing means, and second ends being fixed by second fixing means to a ring of composite material fixed securely to said composite material combustion chamber, the flexibility of said fixing tongues allowing expansion to take place freely in a radial direction at high temperatures between said composite material combustion chamber and said metal annular shells.

With this particular structure for the fixed connection, the various kinds of wear due to contact corrosion in prior art systems can be avoided. The use of a ring made of composite material to provide sealing of the stream also makes it possible to keep the initial structure of the chamber intact. In addition, the presence of flexible metal tongues replacing the traditional flanges gives rise to a saving in mass that is particularly appreciable. In addition to being flexible, these tongues make it easy to accommodate the expansion difference that appears at high temperatures between metal parts and composite parts (by accommodating the displacements due to expansion) while still ensuring that the combustion chamber is properly held and well centered in the annular shell.

The first and second fixing means are preferably constituted by a plurality of bolts.

In an advantageous embodiment in which each of said metal annular shells is made up of two portions, said metal ring interconnecting said first ends of said metal fixing tongues is mounted between connecting flanges of said two portions. In an alternative embodiment, said metal ring can be fixed directly to said annular shell by fixing means.

Depending on the intended embodiment, said first ends of the fixing tongues can either be fixed by brazing to said metal ring, or else they can be formed integrally with said metal ring.

In a preferred embodiment, said composite ring is brazed onto a downstream end of the combustion chamber. In an alternative embodiment, the composite ring is sewn onto the downstream end. In another embodiment, the composite ring is implanted on the downstream end.

Said composite ring includes a determined portion forming a bearing plane for a sealing gasket (advantageously of the circular "spring blade" gasket type) ensuring that the stream of gas between said combustion chamber and said nozzle is sealed. Said determined portion is preferably an end portion of said composite ring.

BRIEF DESCRIPTION OF THE DRAWINGS

The characteristics and advantages of the present invention appear better from the following description made by way of non-limiting indication and with reference to the accompanying drawings, in which:

FIG. 1A is a fragmentary view of a flexible fixing tongue of a first embodiment of the invention;

FIG. 1B is a fragmentary cross sectional view of a portion of FIG. 1 in an alternative crimping connection configuration;

FIG. 2 is a view on a larger scale showing a portion of FIG. 1 in an alternative connection configuration; and FIG. 3 is an enlarged view of another portion of FIG. 1 in an alternative connection configuration.

DETAILED DESCRIPTION OF A PREFERRED EMBODIMENT

Figure 1:
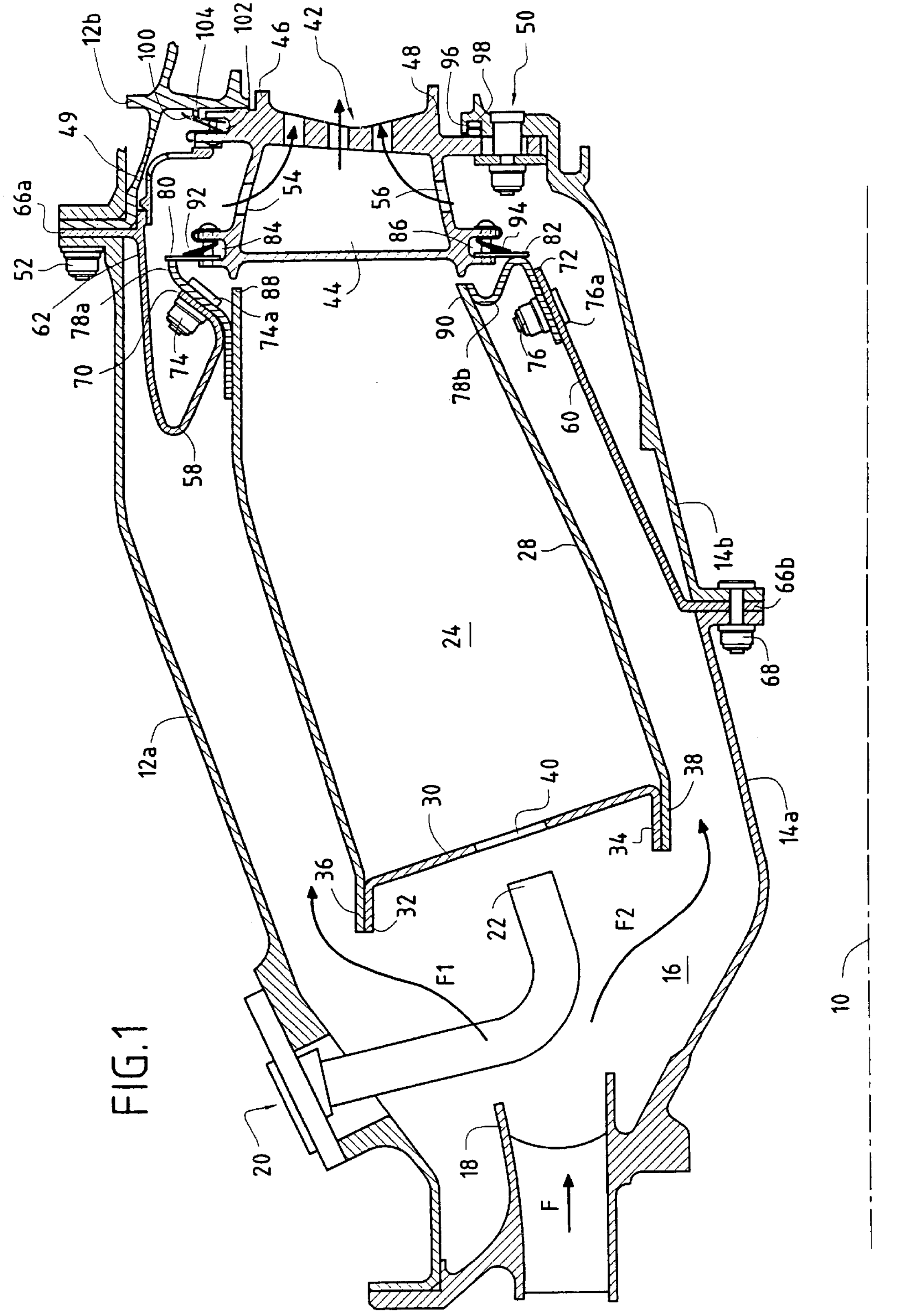
FIG. 1 is a diagrammatic axial half-section of a central zone of a turbomachine in a first embodiment of the invention.

FIG. 1 is an axial half-section view of a central portion of a turbojet or a turboprop (with the term "turbomachine" being used generically in the description below) and comprising:

- an outer annular shell (or outer casing) made up of two portions 12*a* and 12*b* of metal material, having a longitudinal axis 10;
- an inner annular shell (or inner casing) that is coaxial therewith and likewise comprises two portions 14*a* and 14*b*, also made of metal material; and an annular space 16 extending between the two shells 12*a*, 12*b* and 14*a*, 14*b* for receiving compressed oxidizer, generally air, coming from an upstream compressor (not shown) of the turbomachine via an annular diffuser duct 18 defining a general flow F of gas.

In the gas flow direction, this space 16 comprises firstly an injection assembly formed by a plurality of injection systems 20 that are regularly distributed around the duct 18, each comprising a fuel injection nozzle 22 fixed to an upstream portion 12*a* of the outer annular shell 12 (in order to simplify the drawings, the mixer and the deflector associated with each injection nozzle are omitted), followed by a combustion chamber 24 of high temperature composite material, e.g. of the CMC type or of some other type (e.g. carbon), formed by an outer axially-extending side wall 26 and an inner axially-extending side wall 28, both disposed coaxially about the axis 10, and a transversely-extending end wall 30 of said combustion chamber and which has margins 32, 34 fixed by any suitable means, e.g. metal or refractory bolts with flat head screws, to the upstream ends 36, 38 of said side walls 26, 28, this chamber end wall 30 being provided with through orifices 40 to enable fuel to be injected together with a fraction of the oxidizer into the combustion chamber 24, and finally an annular nozzle 42 of metal material forming an inlet stage of a high pressure turbine (not shown) and conventionally comprising a plurality of fixed blades 44 mounted between an outer circular platform 46 and an inner circular platform 48.

The nozzle is fixed to the downstream portion 14*b* of the inner annular shell of the turbomachine by first removable fixing means preferably constituted by a plurality of bolts 50, while resting on support means 49 secured to the outer annular shell of the turbomachine.

Through orifices 54, 56 formed in the outer and inner metal platforms 46 and 48 of the nozzle 42 are also provided to cool the fixed blades 46 of this nozzle at the inlet to the rotor of the high pressure turbine using compressed oxidizer available at the outlet from the diffusion duct 18 and flowing in two flows F1 and F2 on either side of the combustion chamber 24.

The combustion chamber 24 has a coefficient of thermal expansion that is very different from that of the other parts forming the turbomachine, since they are made of metal. In accordance with the invention, the combustion chamber 24 is held securely in position between the inner and outer annular shells by a plurality of flexible tongues 58, 60 regularly distributed around the combustion chamber. A first fraction of these fixing tongues (see the tongues referenced 58) is mounted between the outer annular shell 12*a*, 12*b* and the outer side wall 26 of the combustion chamber, while a second fraction (like the tongues 60) is mounted between the inner annular shell 14*a*, 14*b* and the inner side wall 28 of the combustion chamber.

Each flexible fixing tongue of metal material can be substantially triangular in shape as shown in FIG. 1A or it can be constituted by a single blade (of optionally constant width), and it is welded or brazed at a first end 62; 64 to a metal ring 66*a*, 66*b* fixed securely by first fixing means 52; 68 to one or the other of the inner and outer metal annular shells 12, 15 (depending on where it is located) and intended to make it easier both to hold these tongues and to seal the annular gap 16. In a preferred embodiment, these tongues and the metal ring together form a single one-piece metal part. At a second end 70; 72, each tongue is securely fixed via second fixing means 74, 76 to a ceramic composite ring 78*a*; 78*b* brazed onto a downstream end 88; 90 of the outer and inner side walls 26 and 28 of the ceramic composite material combustion chamber. This brazing can be replaced or even reinforced by stitching. The connection between the chamber walls and the rings can also be made entirely by implantation (connection of the type known by the term "pin' sage"). By way of example, the number of tongues can be a number that is equal to the number of injection nozzles or to a multiple of said number.

FIG. 1 shows a first embodiment of the invention in which the second ends of the tongues 70, 72 are respectively fixed on the outer and inner ceramic composite rings 78*a* and 78*b* by simple bolting (but crimping could also be envisaged, as shown in fragmentary view in FIG. 1B). The metal ring 66*a*, 66*b* interconnecting the first ends 62, 64 of the tongues is preferably clamped between the existing connection flanges between the upstream and downstream portions of the inner and outer annular shells 14, 12 and held securely by the first fixing means 52, 68 which are preferably likewise of the bolt type. It should be observed that ceramic composite material washers 74*a*; 76*a* are provided to enable the flat headed screws of the bolts forming the second fixing means 74; 76 to be "embedded".

In the variant shown in FIG. 2, the metal ring 66*a* interconnecting the first ends 62 of the fixing tongues 58 of the outer side wall 26 of the combustion chamber by welding (or brazing) is no longer mounted between flanges but is itself welded (or brazed) to a centered keying element 106 secured to the outer annular shell 12.

In another variant shown in FIG. 3, the metal ring 66*b* interconnecting the first ends 64 of the fixing tongues 60 of the inner side wall 28 of the combustion chamber by welding (or brazing) is no longer mounted between flanges but is merely fixed directly to the inner annular shell 14 by fixing means 108, e.g. of the bolt type.

The stream of gas between the combustion chamber 24 and the nozzle 42 is sealed by a circular "spring blade" gasket 80, 82 mounted in a groove 84, 86 of each of the outer and inner platforms 46 and 48 of the nozzle and which bear directly against a portion of the ceramic composite ring 78*a*; 78*b* forming a bearing plane for said circular sealing gasket. The portion can be an end portion of the ring. The gasket is pressed against said end portion of the composite ring or any other portion by means of a resilient element 92, 94 fixed to the nozzle. By means of this disposition, perfect sealing is ensured for the hot stream between the combustion chamber 24 and the nozzle 42.

The gas flows between the combustion chamber and the turbine are sealed firstly by an omega type circular sealing gasket 96 mounted in a circular groove 98 of a flange of the inner annular shell 14 in direct contact with the inner circular platform 48 of the nozzle, and secondly by another circular spring blade gasket 100 mounted in a circular groove 102 of the outer circular platform of the nozzle 46 and having one end in direct contact with a circular projection 104 on the downstream portion 12*b* of the outer annular shell.

In all of the above-described configurations, the flexibility of the fixing tongues makes it possible to accommodate the thermal expansion difference that appears at high temperatures between the composite material combustion chamber and the metal annular shells, while continuing to hold and position the combustion chamber.

What is claimed is:

1. A turbomachine comprising inner and outer annular shells of metal material containing in a gas flow direction F: a fuel injector assembly, an annular combustion chamber of composite material and having a longitudinal axis, and an annular nozzle of metal material and forming the fixed-blade inlet stage of a high pressure turbine, wherein said composite material combustion chamber is held in position between said inner and outer metal annular shells by a plurality of flexible metal tongues, first ends of said tongues being interconnected by a metal ring fixed securely to each of said inner and outer metal annular shells by first fixing means, and second ends being fixed by second fixing means on a ring of composite material fixed securely to said composite material combustion chamber, the flexibility of said metal fixing tongues allowing expansion to take place freely in a radial direction at high temperatures between said composite material combustion chamber and said metal annular shells.

2. A turbomachine according to claim 1, wherein said first and second fixing means are constituted by a plurality of bolts.

3. A turbomachine according to claim 1, wherein each of said metal annular shells is made up of two portions, and said metal ring interconnecting said first ends of said metal fixing tongues is mounted between the connection flanges of said two portions.

4. A turbomachine according to claim 1, wherein said metal ring interconnecting said first ends of said metal fixing tongues is fixed directly to said annular shell by fixing means.

5. A turbomachine according to claim 1, wherein said first ends of the metal fixing tongues are fixed by brazing or welding to said metal ring.

6. A turbomachine according to claim 1, wherein said first ends of the metal fixing tongues are integrally formed with said metal ring.

7. A turbomachine according to claim 1, wherein said composite ring is brazed onto a downstream end of the combustion chamber.

8. A turbomachine according to claim 1, wherein said composite ring is sewn onto a downstream end of the combustion chamber.

9. A turbomachine according to claim 1, wherein said composite ring is implanted on a downstream end of the combustion chamber.

10. A turbomachine according to claim 1, wherein said composite ring includes a determined portion forming a bearing plane for a sealing gasket ensuring that the stream of gas between said combustion chamber and said nozzle is sealed.

11. A turbomachine according to claim 10, wherein said determined portion is an end portion of said composite ring.

12. A turbomachine according to claim 10, wherein said sealing element is of the circular spring blade gasket type.

* * * * *